Dec. 20, 1966 E. W. HENNING ETAL 3,293,451

PEAK DETECTOR

Filed Sept. 30, 1963

*INVENTOR.*
EUGENE W. HENNING
JOHN R. NOWELL
BY
[signature]
ATTORNEY

United States Patent Office 3,293,451
Patented Dec. 20, 1966

3,293,451
PEAK DETECTOR

Eugene W. Henning and John R. Nowell, Phoenix, Ariz., assignors to General Electric Company, a corporation of New York Filed Sept. 30, 1963, Ser. No. 312,498
6 Claims. (Cl. 307—88.5)

Figure 1:
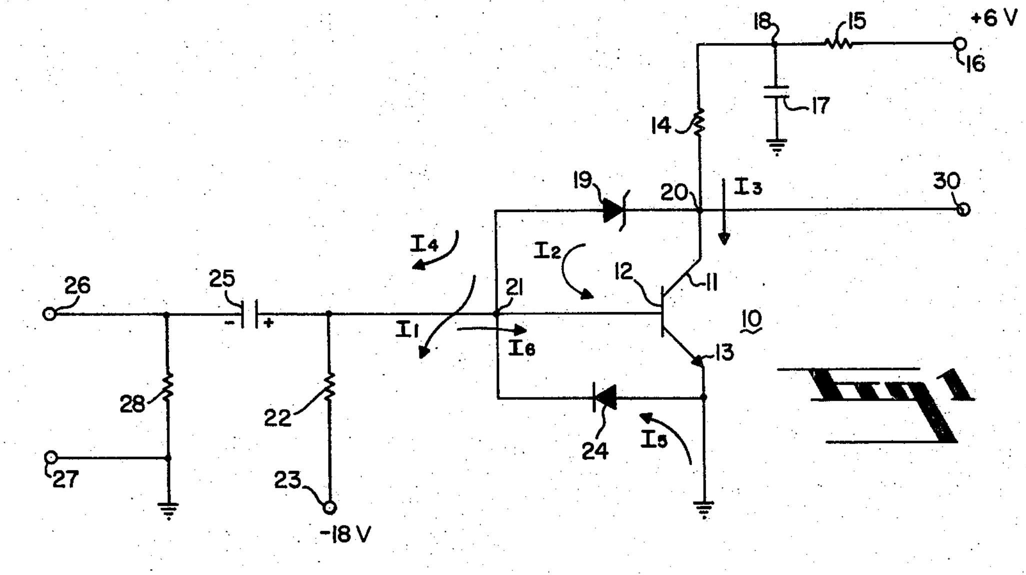

This invention relates to peak detector circuits and more particularly to detector circuits which are especially suited to detect electrical signals generated in tape handlers employed in data processing systems by transforming variously shaped pulses into rectangular pulses whose each leading edge occurs at the instant the original pulse passes through its maximum or minimum.

Magnetic tape is widely used for storing information in high speed electronic data processing systems. The tape is usually carried on two storage reels, a supply reel and a take-up reel. As the tape is transferred from supply reel to take-up reel, it moves against one or more magnetic tape heads which can either "read" stored information from the tape or can "write" information on the tape for storage. In other systems information is stored in a similar manner on a revolving drum having a magnetic material deposited upon the surface.

Digital information may be stored on magnetic tape or magnetic drums in the form of magnetic polarity reversals. In sensing these reversals, pulses are generated by the magnetic read head. In the high density recording used in present day equipment, information read from the tape or drum may have large variations in wave shapes and amplitudes. To correct the distortion of these recorded signals, detectors have been developed which are sensitive to peak values of signals and which reconvert the distorted waveforms into rectangular pulses.

Some prior art peak detectors employ a capacitor which charges to the average value of the input waveform. The capacitor voltage provides a threshold bias voltage for the detector. When the average amplitude of the signal pulses is large, the capacitor charges to a relatively large voltage. To produce a binary output signal all pulses must exceed the value of the threshold voltage on the capacitor. Signal pulses read from magnetic tape may vary in amplitude by more than a 5 to 1 ratio. As a result, prior art detectors often fail to produce a binary output signal in response to small input pulses which have an amplitude less than the average value of the other pulses.

To reduce the possibility of smaller amplitude signals being undetected some prior art detectors employ an expensive multistage amplifier, having automatic gain control, ahead of the detector. Such amplifiers increase the amplitude of the smaller pulses more than the larger pulses, so all signal pulses into the detector have nearly equal amplitudes.

Other prior art peak detector circuits employ a differentiator, followed by an amplifier and a detector biased to cutoff. During the time the positive portion of the differentiated waveform is applied to the detector, the detector is held cutoff. As the differentiated and amplified waveform reverses polarity, the detector conducts producing an output pulse. Larger signals may overdrive the amplifier and so cause it to be driven into cutoff or saturation and distort the waveform whereby errors may be introduced into the information originally stored on magnetic tape. To reduce the possibility of such errors, it is necessary in this latter type of circuit to employ automatic gain control in the amplifier circuits.

It is therefore the principal object of the present invention to provide an improved peak signal detector.

Another object of this invention is to provide a peak signal detector which is more reliable in operation than the prior art circuits.

Another object of this invention is to provide an improved peak signal detector which is less expensive to construct than the prior art circuits.

Still another object of this invention is to provide an improved peak detector which responds to a wider range of pulse amplitudes than the prior art circuits.

The foregoing objects are achieved by providing a peak detector wherein a transistor is biased in a conductive condition very near cutoff by reverse current through a Zener diode which is connected between collector and base of the transistor. When an input pulse is applied to the transistor base, feedback from transistor output through the Zener diode to the transistor input prevents the output voltage from changing until the input voltage reaches the peak of the pulse. When the input voltage recedes from the pulse peak, the diode no longer provides feedback. The receding voltage provides a current which causes the transistor to saturate thereby providing a square pulse at the output terminal. A wide range of amplitudes of input pulses can be used to obtain square output pulses having a uniform amplitude.

Figure 2:
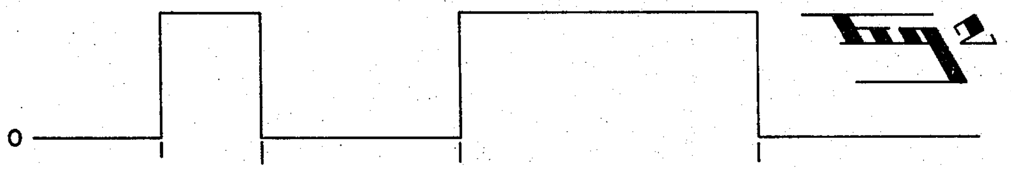
Figure 3:
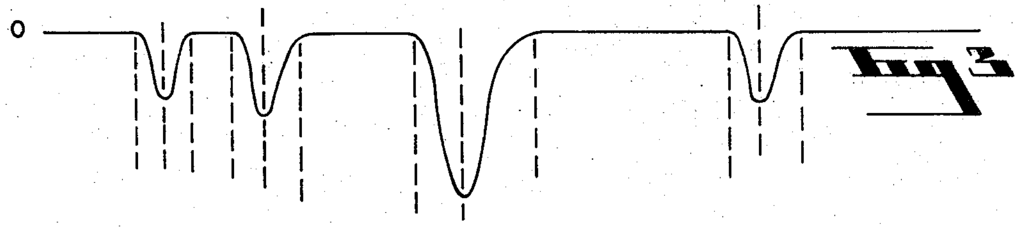
Figure 4:
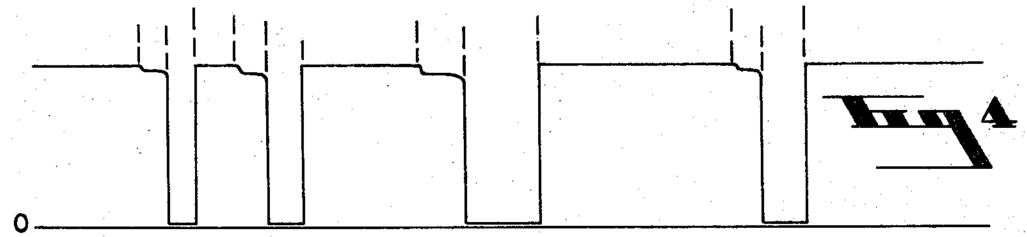

Other objects and advantages of the invention will become apparent from the following detailed description when taken in connection with the accompanying drawings, wherein:

FIG. 1 is a diagram of an electrical circuit utilized in the present invention; and FIGS. 2, 3 and 4 are waveforms useful in explaining the operation of the instant invention.

FIG. 1 illustrates a peak detector circuit comprising a transistor 10 having a collector electrode 11, a base electrode 12 and an emitter electrode 13. A pair of resistors 14 and 15 are serially connected between collector 11 and a terminal 16 which is connected to a suitable positive potential source such as +6 volts. Resistor 14 is the collector load resistor. Emitter 13 of transistor 10 is connected to ground. A capacitor 17 has one terminal connected to a junction point 18 between resistors 14 and 15, and has the other terminal connected to ground. Capacitor 17 and resistor 15 constitute a decoupling network. Resistor 15 limits the amount of current flowing from terminal 16 through transistor 10 and capacitor 17 provides a relatively large momentary current flow through transistor 10 at the instant that transistor 10 is rendered saturated.

A Zener diode 19 connected between collector 11 and base of transistor 10 provides unidirectional current feedback from collector 11 to base 12. The cathode of Zener diode 19 is connected to a junction point 20, which in turn is connected to collector 11 of transistor 10. The anode of Zener diode 19 is connected to a junction point 21, which in turn is connected to base 12 of transistor 10. The Zener diode has the characteristic of providing a constant voltage drop across its terminals for a wide range of amplitude of currents flowing through the diode in a reverse direction; that is, from cathode to anode. Therefore, the voltage difference between junction point 20 and junction point 21 will be constant whenever the voltage applied between junction point 20 and junction point 21 is positive and exceeds the "Zener" or critical breakdown voltage of diode 19.

A resistor 22 has one terminal thereof connected to base 12 of transistor 10 and the other terminal connected to a terminal 23, which in turn is connected to a suitable negative potential, such as −18 volts. The bias or operating point on the characteristic curve of transistor 10 is determined by the voltages at terminals 16 and 23, by the values of resistors 14, 15 and 22, by the characteristics of Zener diode 19, and by the parameters of the transistor itself.

A diode 24 has the anode thereof connected to ground and the cathode connected to base 12 of transistor 10 to limit the amplitude of negative signal voltage at base 12. A capacitor 25 is connected between an input terminal 26 and base 12 of transistor 10. An input terminal 27 is connected to ground. A resistor 28 has one terminal thereof connected to input terminal 26 and the other terminal connected to ground. An output terminal 30 is connected to collector 11 of transistor 10.

The operation of the circuit of FIG. 1 will now be described. When no signal is applied to input terminal 26 a current $I_1$ flows from terminal 16 through resistors 15 and 14, Zener diode 19, and resistor 22 to terminal 23. The proper choice of values of resistors 14, 15 and 22 and of the characteristics of Zener diode 19 bias transistor 10 in a conductive condition above cutoff by developing a positive voltage between junction point 21 and ground. A current $I_2$ flows from terminal 16 through resistors 15 and 14, Zener diode 19, from base 12 to emitter 13 of transistor 10 to ground thereby rendering transistor 10 conductive. A current $I_3$ flows from terminal 16 through resistors 15 and 14, collector 11 to emitter 13 of transistor 10 to ground. Currents $I_1$, $I_2$ and $I_3$ through resistors 15 and 14 establish the voltage at output terminal 30.

FIG. 2 illustrates a waveform which is stored on magnetic tape in representative form. FIG. 3 illustrates the corresponding rectified waveform after it has been delivered by a read head in scanning the section of tape where the data of FIG. 2 is stored. It is the signal of FIG. 3 which the instant invention is intended to restore to a form suitable for conversion to the original stored waveform of FIG. 2.

The signal voltage applied to input terminal 26 is illustrated in FIG. 3. When the input signal at terminal 26 changes in a negative direction, the voltage at junction point 21 decreases slightly. When the voltage at junction point 21 decreases, current $I_2$ from base 12 to emitter 13 of transistor 10 decreases. This, in turn, causes current $I_3$ from terminal 16 through resistors 15 and 14, collector 11 to emitter 13 of transistor 10 to decrease. A decrease in the value of $I_3$ would cause the voltage of junction point 20 to rise if Zener diode 19 did not provide feedback. A decrease in the voltage at terminal 26 causes a feedback current $I_4$ to flow from terminal 16 through resistors 15 and 14, Zener diode 19 and capacitor 25 to terminal 26 thereby charging capacitor 25 to the polarity shown. Current $I_4$ through resistor 14 provides an additional voltage across resistor 14 thereby maintaining junction point 20 at substantially the same voltage as was present before the input pulse was applied to terminal 26. The resulting constant voltage at output terminal 30 is illustrated in FIG. 4. Current $I_4$ charges capacitor 25 to a voltage substantially equal to the maximum negative voltage of the signal pulse applied to terminal 26.

When a large amplitude negative pulse is applied to terminal 26, current $I_4$ may not be large enough to cause the voltage across capacitor 25 to change as rapidly as the voltage of the input pulse changes. The voltage of junction point 21, connected to capacitor 25, drops below ground potential. A current $I_5$ then flows from ground through diode 24 and capacitor 25 to terminal 26 thereby joining $I_4$ in causing the voltage across capacitor 25 to change at approximately the same rate as the input pulse and prevents further negative excursion of the voltage at junction point 21.

While junction point 21 is below ground, potential transistor 10 is rendered non-conductive. Current $I_4$ through resistors 15 and 14 and Zener diode 19 is large enough to maintain junction point 20 at substantially the same voltage as was present before the input pulse was applied to terminal 26. Currents $I_4$ and $I_5$ charge capacitor 25 to a voltage substantially equal to the maximum negative voltage of the signal pulse applied to terminal 26.

When the input voltage pulse at terminal 26 decreases in amplitude, going positively from the negative peak, a current $I_6$ flows from the right-hand plate of capacitor 25, through base 12 to emitter 13 of transistor 10 to ground and from ground through resistor 28 to the left-hand plate of capacitor 25. Current $I_6$ causes transistor 10 to saturate or conduct heavily. When a transistor saturates it is driven so hard that the output current can no longer increase in response to an increase of input signals. Current $I_3$ from terminal 16 through resistors 15 and 14, collector 11 to emitter 13 of transistor 10 to ground is large enough to maintain junction point 20, and hence the output voltage, near ground potential during the time the voltage at terminal 26 is decreasing in amplitude. Due to the low value of voltage between junction points 20 and 21, feedback current $I_4$ no longer flows. Thus the feedback between collector electrode 11 and base electrode 12 is non-operative during this portion of the signal input.

The low resistance path provided for capacitor 25 through transistor 10, enables current $I_6$ to discharge capacitor 25 rapidly. The voltage across capacitor 25 decreases at approximately the same rate that the input pulse changes, as the right-hand plate of capacitor 25 is near ground potential due to the low resistance between base electrode 11 and emitter electrode 13 when transistor 10 is conducting. The voltage on left-hand plate of capacitor 25 rises with the input signal. Thus, even if a smaller input pulse should occur after several large input pulses, the output pulses will all be rectangular and have similar amplitudes.

Thus the objects set forth herein are realized by the instant invention wherein a transistor, a diode, and a Zener diode, connected and disposed in a novel arrangement, are employed to give much more reliable peak detection than is possible in prior art detector circuits. The instant invention will respond to a wider range of input signal amplitudes than prior art detectors without the need of an expensive amplifier having automatic gain control.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A peak detector for use with a source of unidirectional electrical signals comprising a semiconductor device having a control electrode and a pair of output electrodes, a biasing means, said device being biased by said biasing means to conduct a very small amount compared to the amount of conduction when said device is in a saturated condition, a feedback means between one of said output electrodes and said control electrode, said feedback means maintaining said device conducting a small amount while the amplitude of the signal voltage is increasing, and an energy storage means, said energy storage means being connected to said source of signals to store a charge which creates a voltage proportional to the amplitude of said signals, said energy storage means providing a current which renders said device saturated while signal amplitude is decreasing to render said feedback means non-operative, whereby said detector produces a rectangular output pulse as said signal amplitude decreases from a peak voltage value.

2. A peak detector for use with a source of unidirectional electrical signals comprising a transistor having a base, a collector and an emitter, a biasing means, said transistor being biased by said biasing means to conduct a very small amount compared to the amount of conduction when said transistor is in a saturated condition, a unidirectional feedback means, said feedback means being connected between said collector and said base of said transistor to maintain said transistor conducting a small amount while the amplitude of a signal from said source is increasing, and an energy storage means, said energy storage means being connected to said source of signals to store a charge which creates a voltage proportional to the amplitude of said signals, a current from said storage means causing said transistor to saturate while signal amplitude is decreasing, to render said feedback means non-operative, whereby said detector produces a rectangular output pulse as said signal amplitude decreases from a peak voltage value.

3. A peak detector for use with a source of unidirectional electrical signals comprising a transistor having a base, a collector and an emitter, a biasing means, said transistor being biased by said biasing means to conduct a very small amount compared to the amount of conduction when said transistor is in a saturated condition, a Zener diode feedback means, said feedback means being connected between said collector and said base of said transistor to maintain said transistor conducting a small amount while the amplitude of a signal from said source is increasing, and an energy storage means, said energy storage means being connected to said source of signals to store a charge which creates a voltage proportional to the amplitude of said signals, a current from said storage means causing said transistor to saturate and said feedback means to be rendered non-operative while signal amplitude is decreasing, whereby said detector produces a rectangular output pulse as said signal amplitude decreases from a peak voltage value.

4. A peak detector for use with a source of unidirectional electrical signals comprising a transistor having a base, an emitter and a collector, a first, a second and a third reference potential, said collector of said transistor being resistively coupled to said first potential, resistive means connecting said base of said transistor to said second potential, said emitter of said transistor being connected to said third potential, a signal input terminal, a capacitor, said capacitor being connected between said input terminal and said base, an output terminal, said output terminal being connected to said collector, and a Zener diode having a cathode and an anode, said cathode being connected to said collector of said transistor and said anode being connected to said base of said transistor to provide feedback from said collector to said base to maintain said transistor in a conductive condition while a signal from said source is increasing in amplitude, whereby said detector produces a rectangular pulse at said output terminal as said signal amplitude decreases from a peak voltage value.

5. A peak signal detector for use with a source of unidirectional electrical signals comprising a transistor having a base, a collector and an emitter, a first, a second and a third reference potential, said collector of said transistor being resistively coupled to said first potential, resistive means connecting said base of said transistor to said second potential, said emitter of said transistor being connected to said third potential, a signal input terminal, a capacitor, said capacitor being connected between said input terminal and said base, an output terminal, said output terminal being connected to said collector, a means to limit amplitude of voltage excursion at said base of said transistor, and a Zener diode having a cathode and an anode, said cathode being connected to said collector of said transistor and said anode being connected to said base of said transistor to provide feedback from said collector to said base to maintain said transistor in a conductive condition while a signal from said source is increasing in amplitude, whereby said detector produces a rectangular pulse at said output terminal as said signal amplitude decreases from a peak voltage value.

6. A peak signal detector for use with a source of unidirectional electrical signals comprising a transistor having a base, a collector and an emitter, a first, a second and a third reference potential, said collector of said transistor being resistively coupled to said first potential, resistive means connecting said base of said transistor to said second potential, said emitter of said transistor being connected to said third potential, a signal input terminal, a capacitor, said capacitor being connected between said input terminal and said base, an output terminal, said output terminal being connected to said collector, a diode having a cathode and an anode, said cathode being connected to said base of said transistor, said anode being connected to said third potential, and a Zener diode having a cathode and an anode, said cathode of said Zener being connected to said collector of said transistor and said anode of said Zener being connected to said base of said transistor to provide feedback from said collector to said base to maintain said transistor in a conductive condition while a signal from said source is increasing in amplitude, whereby said detector produces a rectangular pulse at said output terminal as said signal amplitude decreases from a peak voltage value.

References Cited by the Examiner

UNITED STATES PATENTS

| | | | |
|---|---|---|---|
| 3,163,779 | 12/1964 | Leightner | 307—88.5 |
| 3,226,566 | 12/1965 | Lacher | 307—88.5 |

FOREIGN PATENTS

| | | |
|---|---|---|
| 916,350 | 1/1963 | Great Britain. |

ARTHUR GAUSS, *Primary Examiner.*

R. H. EPSTEIN, *Assistant Examiner.*